W. B. FEATHERSTONE.
COLOR PHOTOGRAPHY.
APPLICATION FILED MAY 10, 1912. RENEWED JUNE 8, 1914.

1,127,382. Patented Feb. 2, 1915.

WITNESSES:
Harold J. Petrie.
Albert S. Kux

INVENTOR:
Willard B. Featherstone

UNITED STATES PATENT OFFICE.

WILLARD B. FEATHERSTONE, OF WASHINGTON, DISTRICT OF COLUMBIA, ASSIGNOR, BY MESNE ASSIGNMENTS, TO SYNTHETIC CORPORATION, OF NEW YORK, N. Y.

COLOR PHOTOGRAPHY.

1,127,382.  Specification of Letters Patent.  Patented Feb. 2, 1915.

Application filed May 10, 1912, Serial No. 696,424. Renewed June 8, 1914. Serial No. 843,911.

*To all whom it may concern:*

Be it known that I, WILLARD B. FEATHERSTONE, a citizen of the United States, residing at Washington, in the District of Columbia, have invented certain new and useful Improvements in Color Photography, of which the following is a specification.

My invention relates to the projection of pictures in natural colors and stereoscopic relief, and has for its object to provide a picture surface on which images having different color values alternate in such order as to eliminate the color fringes often seen on the screen, and to obviate the need of analyzers to give the effect of relief. I attain these objects by means of the arrangement of images and style of film shown in the accompanying drawing, in which—

Figure 1:
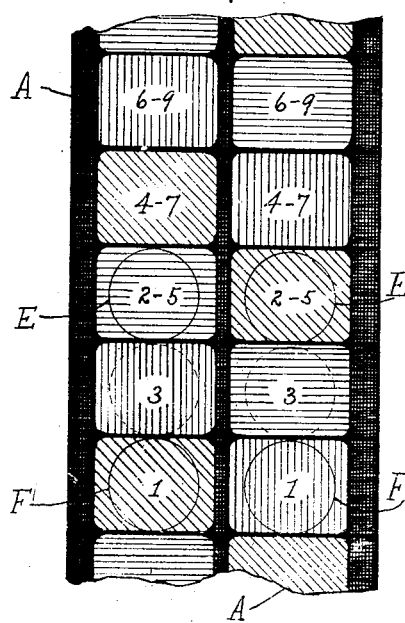
Figure 3:
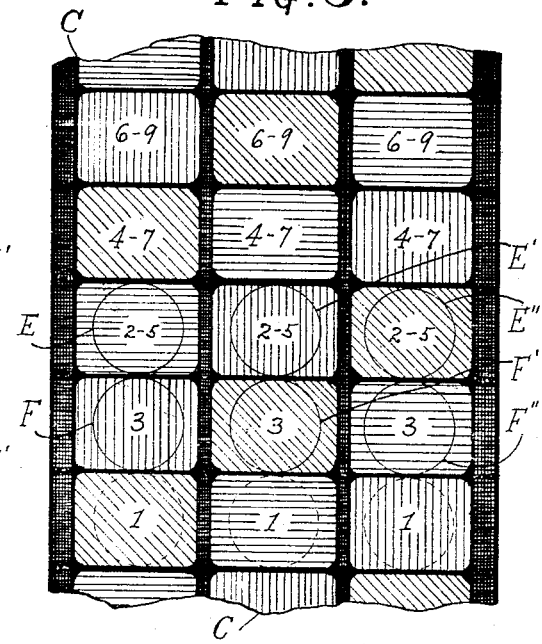
Figure 2:
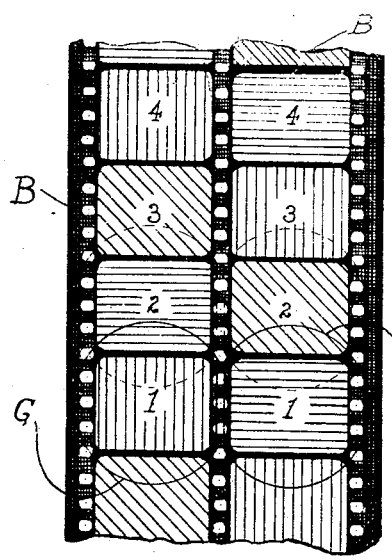
Figure 4:
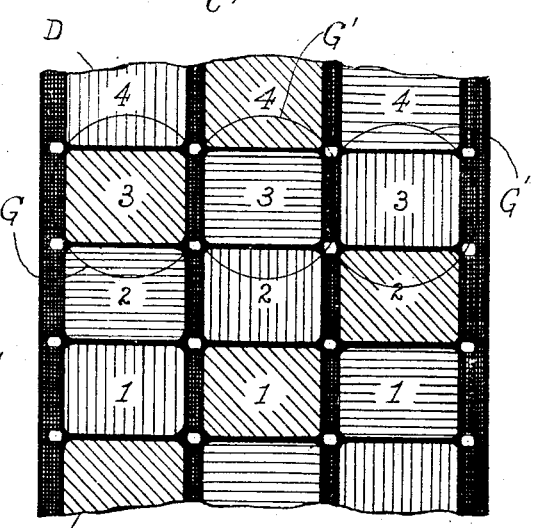

Figure 1 and Fig. 2 show double-row films, each row having images of three alternating color values. Fig. 3 and Fig. 4 show triple-row films, each row having similarly alternating images.

The film A, Fig. 1, has sketched upon it the circles E, E', and F, F', indicating the relative positions of the objectives of a projecting mechanism having alternating reciprocating objectives. The first images exposed are those marked 1, 1, and it will be seen that they are shaded to represent the color values of green and red. The next images to be exposed are those marked 2—5, 2—5, through the lenses E, E'. These images have the color values blue and green. Following these in time of exposure come the images marked 3, 3, through the lenses F, F', which have taken the relative positions indicated by the dotted circles. The color values of images 3, 3, are red and blue, hence it will be seen that a complete color cycle comprises the exposure of three pairs of images, and includes two images of each primary color, red, green and blue or blue-violet.

In Fig. 2, the film B, may be used with any type of cinematograph having a double objective G, G', and the exposure is in the usual order, the first images 1, 1, having color values red and blue, the next images 2, 2, having color values blue and green, and the next 3, 3, green and red, thus completing a double cycle of primary colors.

In Fig. 3, the film C, has upon it three rows of images, the images of each row having three alternating color values, and being so arranged in the respective rows that any transverse group of three images comprises one in each color. Thus, when three objectives are used simultaneously to project the images of such a transverse group, the resultant blended projection is in natural colors, regardless of speed of projection or succession of images. The same type of film is D, Fig. 4, and the circles sketched upon C, Fig. 3, and D, Fig. 4, indicate triple lens mechanisms similar to the double lens mechanisms indicated above. The advantage of this type of film over those in which all of the images in each longitudinal row have the same color values, is that since plural objectives record scenes from different viewpoints, each objective fails to record its particular color in parts of the scene only visible to the other objective or objectives. Hence color fringes result when the corresponding positives are projected.

By my new film each objective records all of the colors in succession; hence any reasonable speed of projection will cause these fringes to disappear, since each row of images, taken from a different viewpoint contains alternate pictures of the scene in all of its colors. The colors may be supplied by coloring the film itself or by separate filtering devices.

I claim:

1. Plural rows of photographic images on a single surface, the images of each row having alternating color values corresponding with primary colors.

2. Plural rows of photographic images on a single surface, the images of each row having color values alternating in sets of three, and the images having a certain color value in one row being adjacent to images in the next row having a different color value.

WILLARD B. FEATHERSTONE.

In presence of—
 HAROLD J. PETRIE.
 R. B. SWOPE.

Copies of this patent may be obtained for five cents each, by addressing the "Commissioner of Patents, Washington, D. C."